(12) United States Patent
McIntosh

(10) Patent No.: US 11,563,924 B2
(45) Date of Patent: *Jan. 24, 2023

(54) PROJECTION SYSTEM FOR TRANSLUCENT DISPLAYS AND METHODS OF OPERATING THEREOF

(71) Applicant: THE BOEING COMPANY, Chicago, IL (US)

(72) Inventor: Darren Carl McIntosh, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,453

(22) Filed: Sep. 7, 2021

(65) Prior Publication Data

US 2021/0409663 A1 Dec. 30, 2021

Related U.S. Application Data

(63) Continuation of application No. 15/929,661, filed on May 14, 2020, now Pat. No. 11,178,365.

(51) Int. Cl.
*H04N 9/31* (2006.01)
*G03B 21/62* (2014.01)
(Continued)

(52) U.S. Cl.
CPC ....... *H04N 9/3147* (2013.01); *B64D 11/0015* (2013.01); *B64D 11/02* (2013.01); *G03B 21/62* (2013.01)

(58) Field of Classification Search
CPC .. H04N 9/3105; H04N 9/3114; H04N 9/3141; H04N 9/3147; H04N 9/3152;
(Continued)

(56) References Cited

U.S. PATENT DOCUMENTS 7,419,265 B2 9/2008 Relke et al.
8,035,624 B2 10/2011 Bell et al.
(Continued)

FOREIGN PATENT DOCUMENTS

DE 102007009378 A1 8/2008

OTHER PUBLICATIONS

European Extended Search Report regarding European Patent Application No. 21170879.7 dated Oct. 11, 2021.

*Primary Examiner* — Sultan Chowdhury
(74) *Attorney, Agent, or Firm* — Armstrong Teasdale LLP

(57) ABSTRACT

A system is provided. The system includes a translucent display positioned such that a first face is a display face and that a second face is a projection face and at least one projector configured to project an image on the second face of the translucent display. The image is displayed on the first face. The system also includes at least one sensor configured to transmit a signal when triggered and a projector controller in communication with the at least one projector and the at least one sensor. The projector controller is programmed to receive a signal from the at least one sensor and instruct the at least one projector to project at least one image on the translucent display in response to the signal from the at least one sensor.

20 Claims, 14 Drawing Sheets

(51) Int. Cl.
*B64D 11/02* (2006.01)
*B64D 11/00* (2006.01)

(58) Field of Classification Search
CPC .... H04N 9/3161; H04N 9/3164; B64D 11/00; B64D 11/02; B64D 11/0015; B64D 11/0689; G03B 21/008; G03B 21/28; G03B 21/62; G03B 21/145; G03B 21/147; G03B 21/625; G03B 21/2013; G03B 21/2033
See application file for complete search history.

(56) References Cited

U.S. PATENT DOCUMENTS

| | | |
|---|---|---|
| 8,100,540 B2 | 1/2012 | Huebner |
| 8,427,395 B2 | 4/2013 | Seder et al. |
| 8,564,502 B2 | 10/2013 | Cui et al. |
| 8,692,739 B2 | 4/2014 | Mathieu et al. |
| 9,810,975 B2 * | 11/2017 | Mahoor ............... H04N 9/3185 |
| 10,191,364 B2 | 1/2019 | Christensen |
| 10,604,271 B2 * | 3/2020 | Breigenzer ........... B64C 1/1469 |
| 2009/0292614 A1 * | 11/2009 | Reichow ................. G09F 19/18 345/173 |
| 2012/0287502 A1 | 11/2012 | Hajjar |
| 2013/0016197 A1 | 1/2013 | Koo |
| 2016/0059965 A1 | 3/2016 | Koyama et al. |
| 2019/0300174 A1 | 10/2019 | Young et al. |
| 2020/0371645 A1 * | 11/2020 | Spencer ............... B64C 1/1492 |

\* cited by examiner

PROJECTION SYSTEM FOR TRANSLUCENT DISPLAYS AND METHODS OF OPERATING THEREOF

CROSS-REFERENCE TO RELATED APPLICATIONS

This application is a continuation of U.S. patent application Ser. No. 15/929,661, filed May 14, 2020, entitled "PROJECTION SYSTEM FOR TRANSLUCENT DISPLAYS AND METHODS OF OPERATING THEREOF," the entire contents and disclosures of which are hereby incorporated herein by reference in its entirety.

BACKGROUND

The field of the present disclosure relates generally to translucent projection systems and, more specifically, to projecting images and video onto translucent displays.

Many purchasers of aircraft and other fleet vehicles require that the vehicle be personalized for their brand or image. In many cases, this includes having logos or images on different surfaces of the vehicle. However, many of these customizations are expensive and would have to be removed if the vehicle is resold. These customizations also require special set-ups on the assembly lines, which then slows down the production process. One particular area of customization is the lavatories of the vehicles, where the purchasers are looking for distinct features to increase their visibility and the comfort of their passengers. Accordingly, it would be advantageous to have a system that allows for customization of surfaces on vehicles without requiring changes to the production of the vehicle.

BRIEF DESCRIPTION

In one aspect, a system is provided. The system includes a translucent display positioned such that a first face is a display face and that a second face is a projection face. The system also includes at least one projector configured to project an image on the second face of the translucent display. The image is displayed on the first face. The system further includes at least one sensor configured to transmit a signal when triggered. In addition, the system includes a projector controller in communication with the at least one projector and the at least one sensor. The projector controller is programmed to receive a signal from the at least one sensor. The projector controller is also programmed to instruct the at least one projector to project at least one image on the translucent display in response to the signal from the at least one sensor.

In another aspect, a method for operating a projector system is provided. The method is implemented by a computing device includes at least one processor in communication with at least one memory device. The method includes receiving a first signal from a first sensor. The method also includes determining a first projection sequence to activate in response to the first signal from the first sensor. The method further includes determining a first translucent display and a corresponding first projector to display the first projection sequence in response to the first signal from the first sensor. In addition, the method includes transmitting instructions to the first projector to project the first projection sequence onto a projection face of the first translucent display, such that the first projection sequence is displayed on a display face of the first translucent display. The projection face is an opposite side of the first translucent display from the display face of the first translucent display. Moreover, the method includes receiving a second signal from a second sensor. Furthermore, the method includes determining a second projection sequence to activate in response to the second signal from the second sensor. In addition, the method also includes determining a second translucent display and a corresponding second projector to display the second projection sequence in response to the second signal from the second sensor. In addition, the method further includes transmitting instructions to the second projector to project the second projection sequence onto a projection face of the second translucent display, such that the second projection sequence is displayed on a display face of the second translucent display, wherein the second translucent display is different from the first translucent display.

In yet another aspect, a lavatory is provided. The lavatory includes a plurality of translucent displays positioned in surfaces of the lavatory. Each translucent display of the plurality of translucent display comprises a first face, and an opposite second face, where the first face is visible. The lavatory also includes a plurality of projectors positioned behind the plurality of translucent display and configured to project on the second face of the plurality of translucent displays. The lavatory further includes a plurality of sensors. In addition, the lavatory includes a computing device including at least one processor in communication with at least one memory device. The computing device is in communication with the plurality of sensors and the plurality of projectors. The at least one processor is programmed to receive a first signal from a first sensor of the plurality of sensors. The at least one processor is also programmed to determine a first projection sequence to display based on the first signal. The at least one processor is further programmed to determine one or more translucent displays of the plurality of translucent displays to project the first projection sequence on. In addition, the at least one processor is programmed to determine one or more projectors of the plurality of projectors associated with the determined one or more translucent displays. Moreover, the at least one processor is programmed to transmit instructions to the determined one or more projectors to display the first projection sequence.

DETAILED DESCRIPTION

Figure 1:
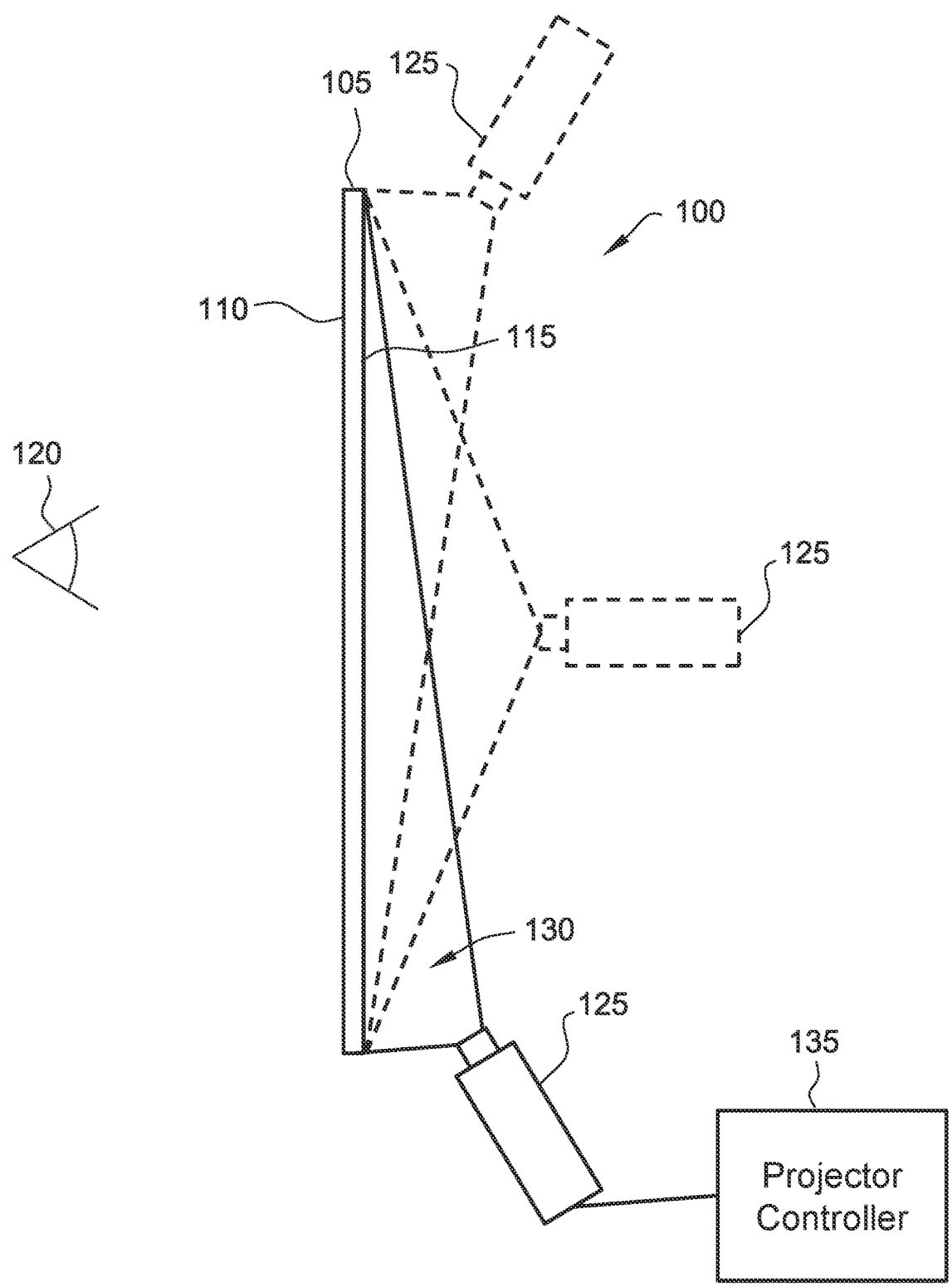
FIG. 1 illustrates a projector system for projecting an image onto a translucent display in accordance with one example of the present disclosure.

The implementations described herein relate to systems and methods for analyzing images and, more specifically, to translucent projection systems and, more specifically, to projecting images and video onto a translucent display including one or more translucent materials. For the purposes of this discussion, a translucent material or display permits light to pass through, but diffuses the light so that objects on the opposite side are not clearly visible. In some examples, the translucent display is made from a material comprising an acrylic polymer and alumina trihydrate (ATH) similar to that of Conan®, created by E. I. duPont de Nemours and Company, Wilmington, Del., (DuPont) which is a solid material.

In particular, the translucent projection system includes a projector, such as a short-throw projector is controlled by a projector controller computer device. The projector controller computer device controls the projector as it transmits images to display on the translucent display. The projector projects the image on a projection face of the translucent display to be displayed through the translucent display on the display face of the translucent display. By projecting onto the projection face of the translucent display, there are no obstructions between the projector and the display being projected onto. This prevents individuals from interposing between the projector and the display being projected onto, thus preventing shadows and other obstructions from obscuring the image. The projector is also hidden away from the viewer to increase the viewing experience. Furthermore, the projectors can be configured to display desired images, allowing for customization without requiring additional equipment. In addition the images may be changed when desired. The projectors can be configured to display images, series of images, videos, and/or animations.

Described herein are computer systems such as the projector controller computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor can include any programmable system including systems using micro-controllers, reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In another example, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some examples, the system includes multiple components distributed among a plurality of computer devices. One or more components can be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments can enhance the functionality and functioning of computers and/or computer systems.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

The patent claims at the end of this document are not intended to be construed under 35 U.S.C. § 112(f) unless traditional means-plus-function language is expressly recited, such as "means for" or "step for" language being expressly recited in the claim(s).

FIG. 1 illustrates a projector system 100 for projecting an image onto a translucent display 105 in accordance with the present disclosure. In the example, a translucent display 105 includes a translucent material that allows light to pass through, but is semi-transparent. For the purposes of this discussion, a translucent material or display permits light to pass through, but diffuses the light so that objects on the opposite side are not clearly visible. In some examples, translucent display 105 is made from a material comprising an acrylic polymer and alumina trihydrate (ATH) similar to that of Conan®, created by E. I. duPont de Nemours and Company, Wilmington, Del., (DuPont) which is a solid material.

In the example, translucent display 105 includes a display face 110 and a projection face 115, where the display face 110 faces a viewer (or observer) 120 and the projection face 115 faces one or more projectors 125. While the projector 125 shown in FIG. 1 is below the translucent display 105, the one or more projector 125 can also be positioned above the translucent display 105, to any side of the translucent display 105, or even directly behind the translucent display 105. The one or more projectors 125 are configured to project images 130 onto the projection face 115 of translucent display 105. The image 130 is then viewed by the viewer 120 through the translucent display 105. In the example, the projector 125 projects the image 130 in reverse, so that it can be displayed in the proper orientation by the viewer 120. In the example, the projector 125 is at least one of a short throw projector, an ultra-short throw projector, a GOBO (goes before objects) projector, or other projector that works as described herein. The term GOBO (Go Before Optics) specifically refers to a device placed in "the gate" or at the "point of focus" between the light source and the lenses (or other optics). In the example, the projector 125 is only a short distance from the translucent display 105 and is configured to project on translucent display from that close distance. Furthermore, the projector 125 is configured to project onto curved or uneven surfaces, so that the image 130 does not appear distorted to the viewer 120. In this example, the projector 125 is programmed to adjust the image 130 that is projected to the contours and shape of the translucent display 105 that is being projected on to avoid skew. This adjustment can be made when the projector 125 is originally configured while being installed.

The projector 125 is controlled by a projector controller 135. The projector controller 135 instructs the projector 125 as to which images 130 to project and when to project those images. The projector controller 135 can provide images to the projector 125. The projector controller 135 can also provide images that have been adjusted to the contours of the translucent display 105 to the projector 125. If the projector controller 135 determines that it is appropriate to go into a sleep mode, the projector controller 135 would then instruct the projector 125 to stop projecting images 130 to conserve energy, to reduce heat, and/or to reduce wear and tear on the projector 125. The projector controller 135 can activate sleep mode a predetermined period of time after a sensor signal has been received, after a series of images have been displayed a predetermined period of time, after a specific sensor signal has been received, or based on a command from one or more other computer devices. In some examples, the projector controller 135 is a part of the projector 125. In other examples, the projector controller 135 is separate from and in communication with the projector 125. In some further examples, the projector controller 135 controls multiple projectors 125.

Figure 2:
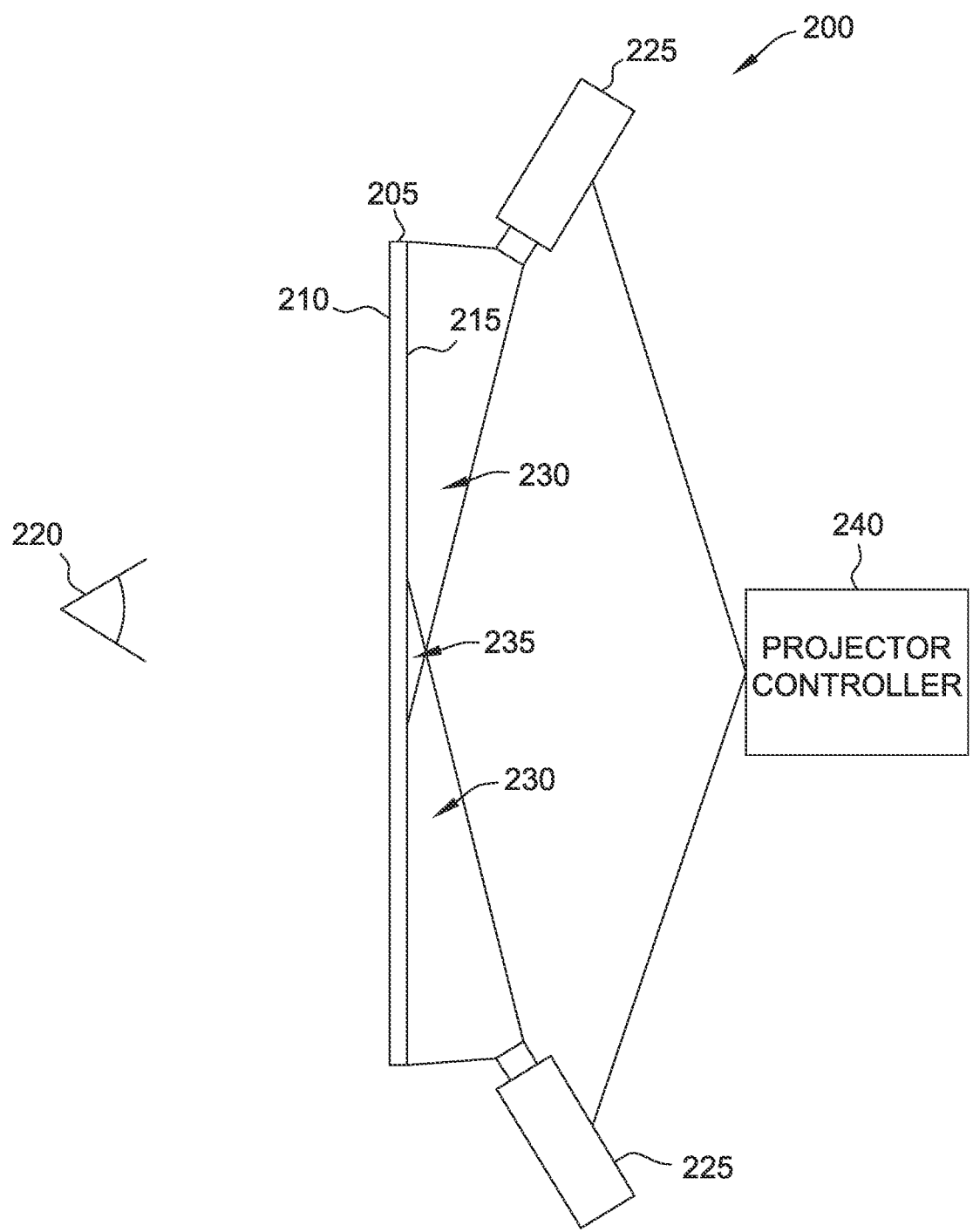
FIG. 2 illustrates another projector system for projecting an image onto a translucent display in accordance with one example of the present disclosure.

FIG. 2 illustrates a block diagram of another projector system 200 for projecting an image onto a translucent display 105 in accordance with another example of the present disclosure. In projector system 200, translucent display 105 includes a display face 110 and a projection face 115. The display face 110 faces a viewer (or observer) 120. Projector system 200 also includes a plurality of projectors 125. Each of the plurality of projectors 125 are configured to project images 205 and 210 onto the projection face 115 of the translucent display 105. The projector controller 135 controls each of the projectors 125 to determine which part of the image 210 for each projector 125 to display based on the size and shape of the translucent display 105.

Furthermore, the projectors 125 are configured to project the image 210 to include an overlap area 215. The projector controller 135 is programmed to control the plurality of projectors 125. The projector controller 135 instructs each projector 125 which image 205 and 210 to project and what to project in the overlap area 215. The projector controller 135 can use color matching and edge blending techniques to illuminate the overlap area 215 so that there is no visible difference to the viewer 120 between the image 205 and 210 and the overlap area 215.

Figure 3:
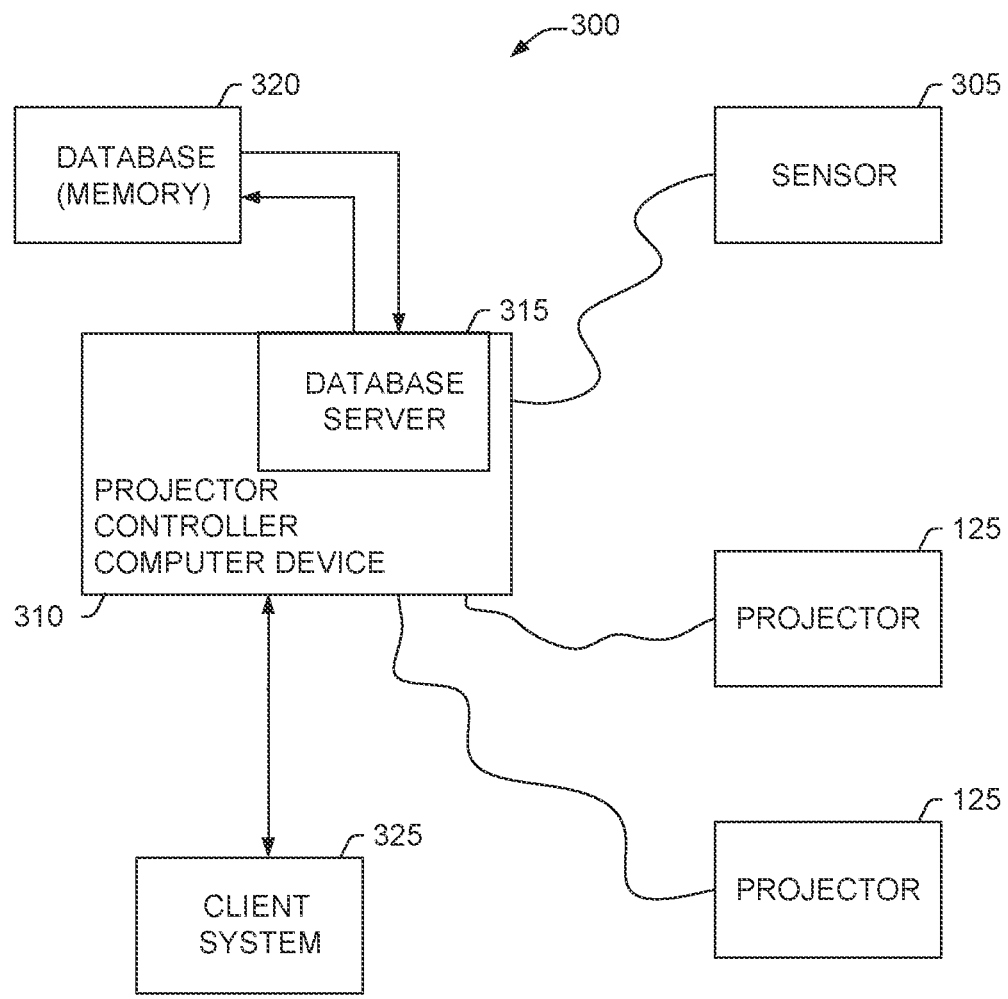
FIG. 3 is a simplified block diagram of an example system for executing the projector systems shown in FIGS. 1 and 2.

FIG. 3 is a simplified block diagram of an example system 300 for executing the projector systems 100 and 200 (shown in FIGS. 1 and 2). In the example, the system 300 is used for controlling projectors 125. The system 300 is a projector controlling computer system that includes a projector controller computer device 310 (also known as a projector controller server) configured to project images onto surfaces. In some examples, the projector controller computer device 310 is programmed to control one or more projectors 125 based on data received from one or more sensors 305. In the example, projector controller computer device 310 is similar to projector controller 135 (shown in FIG. 1).

Projectors 125 are configured to project an image 130 onto the projection face 115 of a translucent display 105 so that the image 130 is displayed on the display face 110 of the translucent display 105 (all shown in FIG. 1).

In system 300, sensors 305 receive signals about the actions of a user. The sensors 305 can include, but are not limited to, faucet sensors, door lock sensors, flush button sensors, automatic paper towel dispenser sensor, motion sensors, infrared sensors, light sensors, and or any other sensor that allows the system 300 to operate as described herein. Sensors 305 connect to projector controller computer device 310 through various wired or wireless interfaces including without limitation a network, such as a local area network (LAN) or a wide area network (WAN), dial-in-connections, cable modems, Internet connection, wireless, and special high-speed Integrated Services Digital Network (ISDN) lines. Sensors 305 receive data about the activities of the user or system, and report those conditions to projector controller computer device 310. In other examples, sensors 305 are in communication with one or more client systems 325. In some examples, sensors 305 are in direct communication with one or more projectors 125, where the projectors 125 are directly activated based on the signals provided by the sensors 305. For example, a projector 805 can activate when a motion sensor detects movement.

In the example, client systems 325 are computers that include a web browser or a software application, which enables client systems 325 to communicate with projector controller computer device 810 using the Internet, a local area network (LAN), or a wide area network (WAN). In some examples, the client systems 325 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client systems 325 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. In at least one example, one or more client systems 325 are associated with aircraft operation, such as for when to illuminate a return to seat image. In another example, the client system 325 provides real-time information, such as financial news to the projector controller computer device 310; so that the projector controller computer device 310 can instruct one or more projectors 125 to display the financial news on a translucent display 105.

A database server 315 is communicatively coupled to a database 320 that stores data. In one example, the database 320 is a database that includes a plurality of projector settings, a plurality of projection sequences, and additional information for projection. In some examples, the database 320 is stored remotely from the projector controller computer device 310. In some examples, the database 320 is decentralized. In the example, a person can access the database 320 via the client systems 325 by logging onto projector controller computer device 310.

Figure 4A:
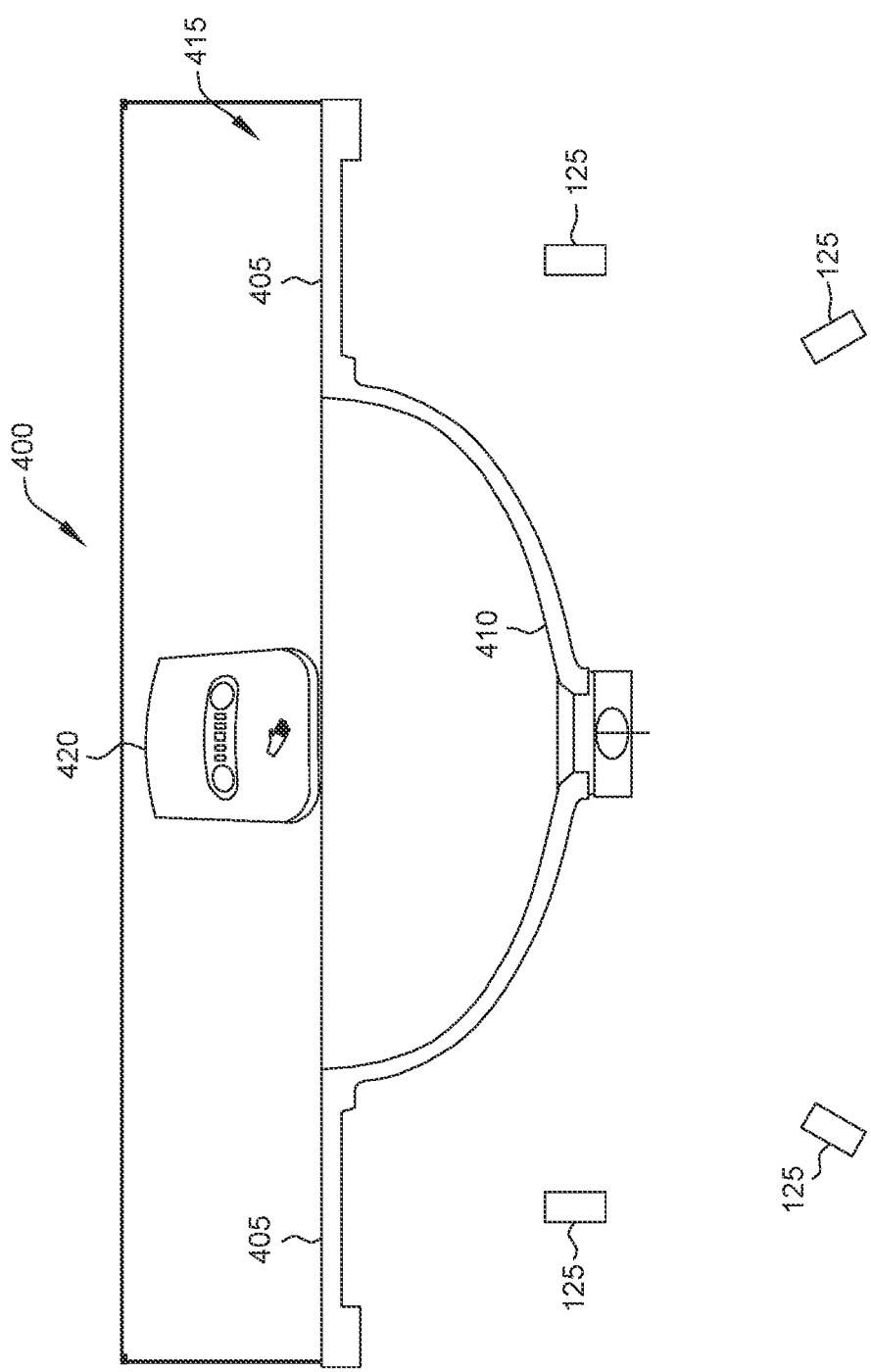
FIGS. 4A and 4B illustrate a sink-based projector system in accordance with at least one example.
Figure 4B:
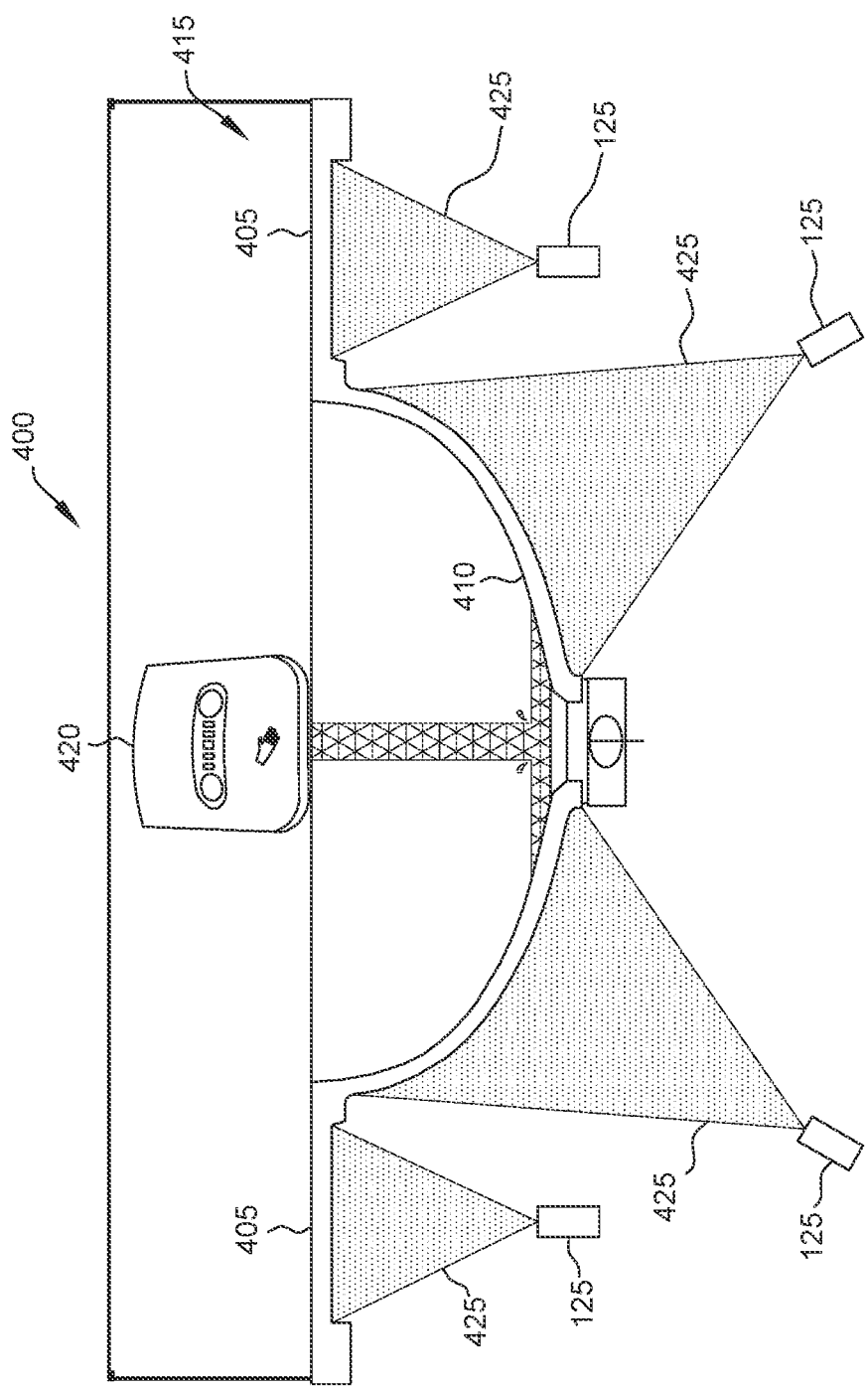

FIGS. 4A and 4B illustrate a sink-based projector system 400 in accordance with at least one example. FIGS. 4A and 4B illustrate a cross-sectional view of the sink-based projector system 400. The sink-based projector system 400 includes countertops 405, a sink area 410, and a splash back area 415. In the example, the sink-based projector system 400 also includes one or more projectors 125 configured to project images 425 onto one of more of the countertops 405, the sink area 410, and the splash back area 415.

In the example, the projectors 125 are configured to project their images when triggered by a triggering device 420, such as a faucet sensor. The triggering device 420 can include one or more sensors 305 (shown in FIG. 3), such that the sensors 305 report a current status of the triggering device 420 (aka on or off). In the sink-based projector system 400, the triggering device 420 is a faucet sensor that detects when a person places their hands near the sink area 410. The triggering device 420 then triggers water to be dispensed into the sink. The triggering device 420 transmits a signal to the projector controller 135 (shown in FIG. 1), which controls the projectors 125. The projector controller 135 instructs the projectors 125 to display one or more images 425. The projector controller 135 can also poll each triggering device 420 to determine a current state of the triggering device 420, such as actively dispensing water through the faucet.

Figure 4C:
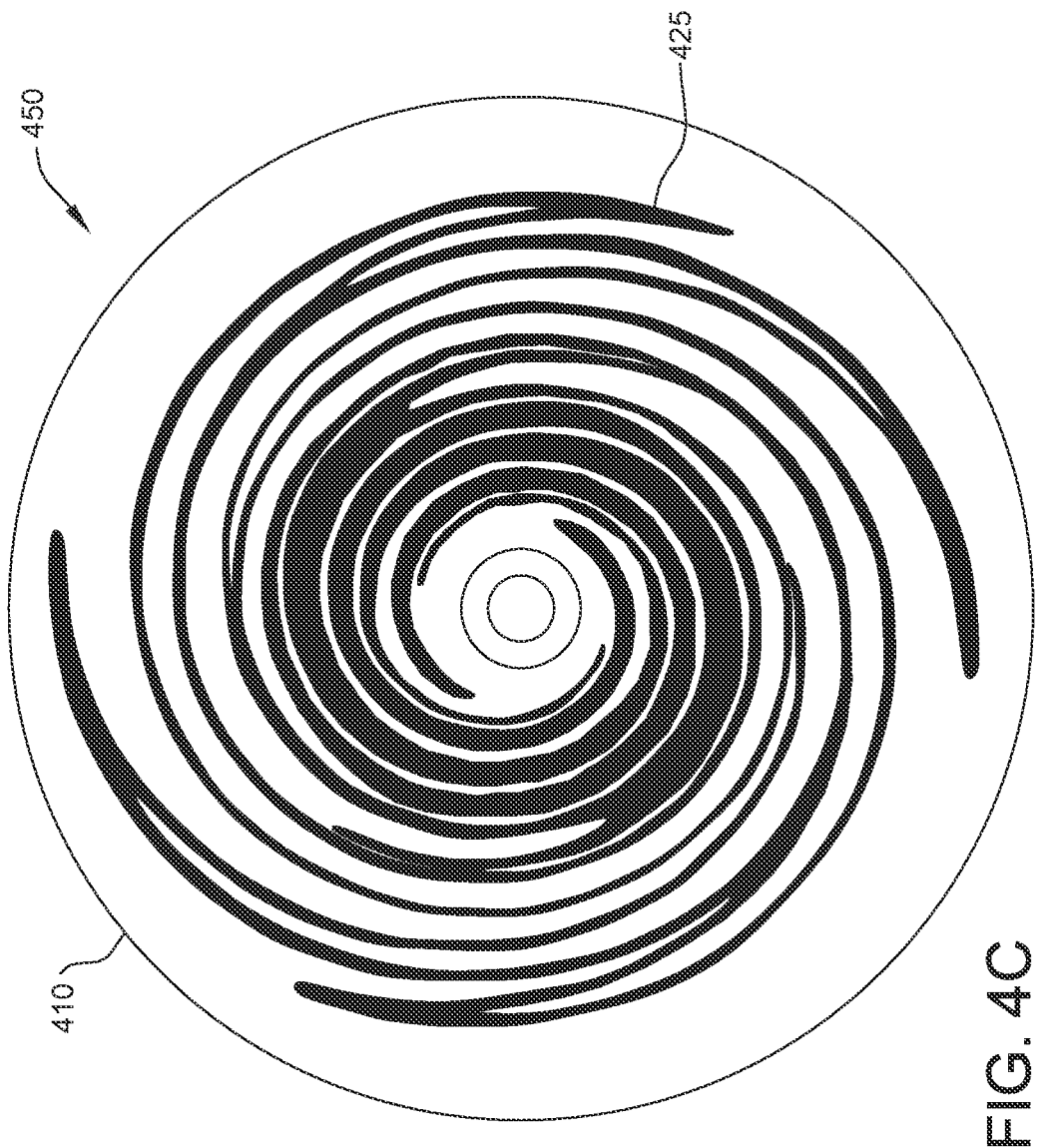
FIG. 4C illustrates a view of operation of the sink-based projector system shown in FIGS. 4A and 4B.

FIG. 4C illustrates an overhead view 450 of operation of the sink-based projector system 400 (shown in FIGS. 4A and 4B). In this overhead view 450, an image 425 of swirling water, as an example, is being projected onto the sink area 410.

Figure 5:
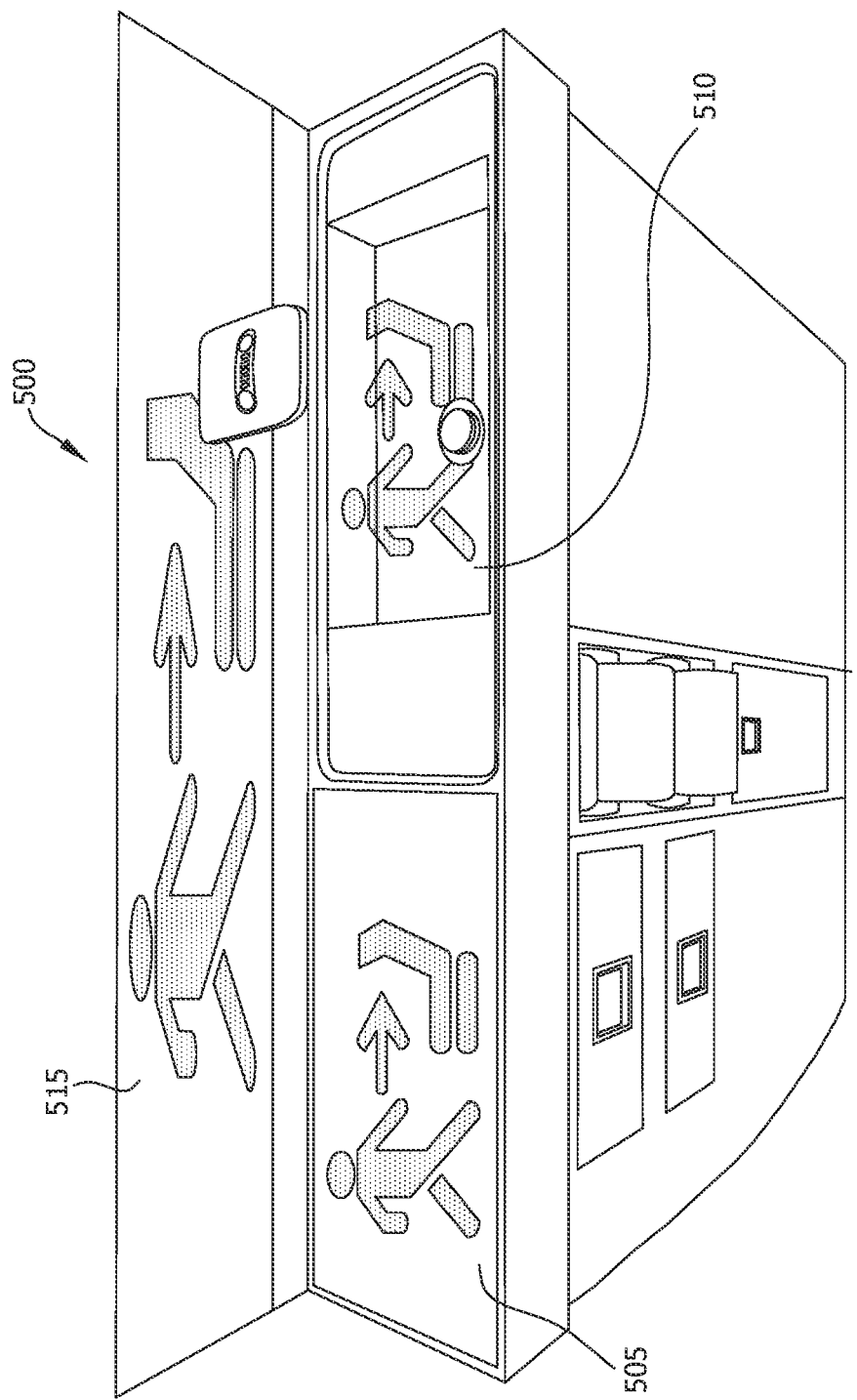
FIG. 5 illustrates a view of a lavatory using the projector systems shown in FIGS. 1, 2, and 3.

FIG. 5 illustrates a view 500 of a lavatory using projector systems 100, 200, and 300 (shown in FIGS. 1, 2, and 3, respectively). View 500 shows multiple display faces 110 of translucent displays 105 (shown in FIG. 1) with projected images, including a countertop face 505, a sink area face 510, and a splash back area face 515. All three of these faces 405, 410, and 415 are displaying an image 130 (shown in FIG. 1) instructing the viewer 120 (shown in FIG. 1) to return to their seat, such as in an aircraft lavatory.

In other situations, other images 130 can be displayed on the faces 505, 510, and 515, such as, but not limited to, branding and logos, destination theming, trip progress information, news, emergency instructions, financial data (e.g., stock ticker information), video clips, and/or any other images or video desired. These images 130 may be displayed based on activation of a triggering device 420 (shown in FIG. 4), a control signal from projector controller 135 (shown in FIG. 1), and a signal from a client system 325 (shown in FIG. 3). In a first example, the projector controller 135 receives a signal from triggering device 420 that the triggering device 420 was activated. This signal causes the projector controller 135 to instruct one or more projectors 125 to project images 130 onto one or more faces 505, 510, and 515. In a second example, the projector controller 135 determines that a predetermined time period has been exceeded since the last signal from a sensor 305 or triggering device 420 and determine to instruct the projectors 125 to stop displaying image 130. In a third example, the projector controller 135 can receive a signal from a client system 325 instructing projector controller 135 to instruct the projectors 125 to display the return to seat image 130 on each face 505, 510, and 515.

Figure 6:
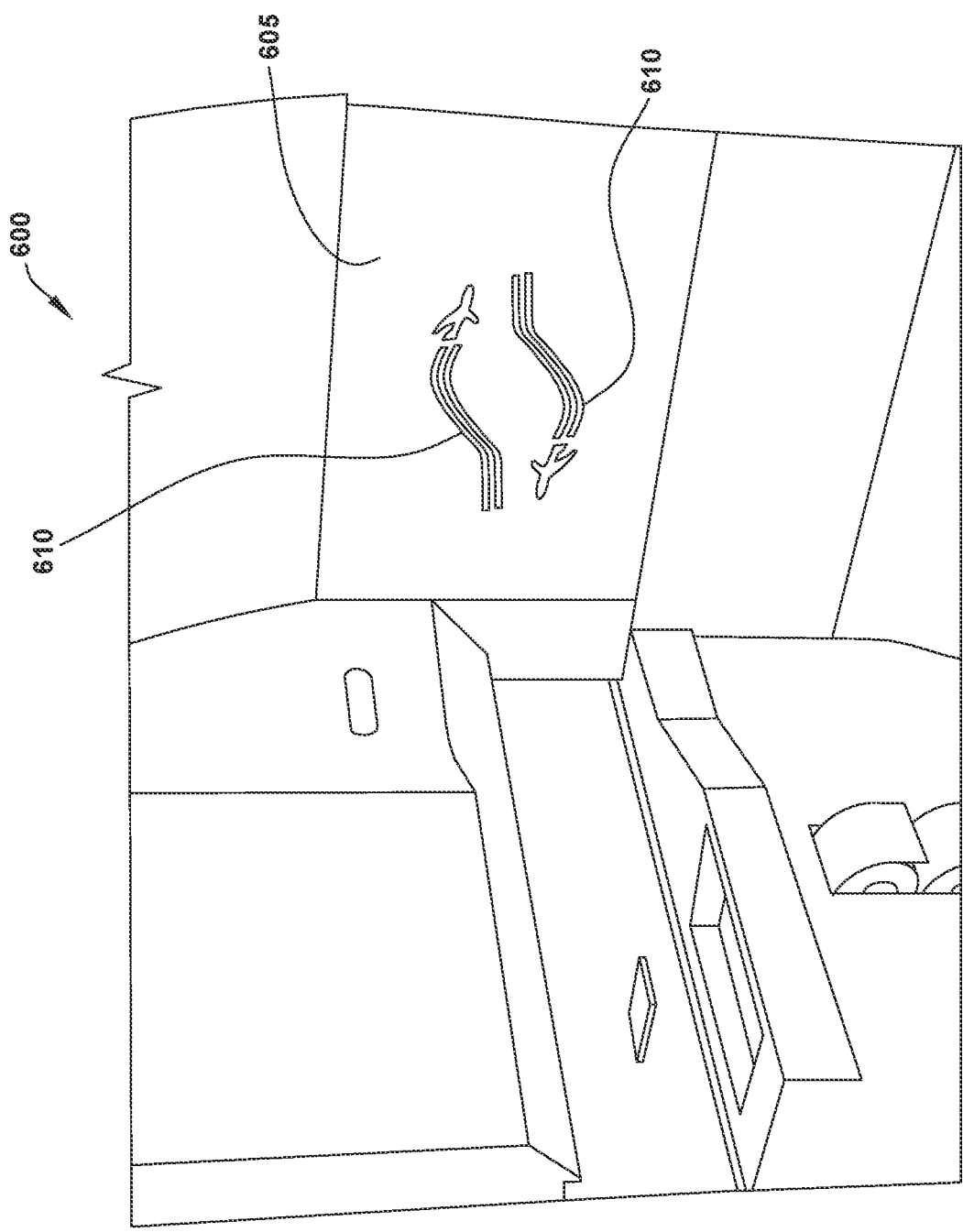
FIG. 6 illustrates another view of a lavatory using the projector systems shown in FIGS. 1, 2, and 3.

FIG. 6 illustrates another view 600 of a lavatory using projector systems 100, 200, and 300 (shown in FIGS. 1, 2, and 3, respectively). In view 600, a projector 125 (shown in FIG. 1) is hidden in the wall behind a baby changing station 605. The baby changing station 605 is a translucent display 105 (shown in FIG. 1) and made of a translucent material. The projector 125 projects an image 610 on the surface of the baby changing station 605 while the baby changing station 605 is in the up or stowed position. In the example, the projector 125 stops projecting image 610 when the baby changing station 605 is opened or in the down or deployed position. In other examples, the projector 125 is in baby changing station 605 and the bottom surface of baby changing station 605 is a translucent display 105. In some examples, the projector 125 begins projecting image 610 when a viewer 120 (shown in FIG. 1) is detected. For example, when the lock on the lavatory is put in the lock position and the lock includes a triggering device 420 (shown in FIG. 4A). The triggering device 420 transmits a signal to the projector controller 135 (shown in 1) to instruct the projectors 125 to display image 610 on the baby changing station 605. The projector controller 135 can also receive a signal from a triggering device 420 associated with the baby changing station 605 to determine whether the baby changing station 605 is in an up or stowed position or a down or deployed position.

Figure 7:
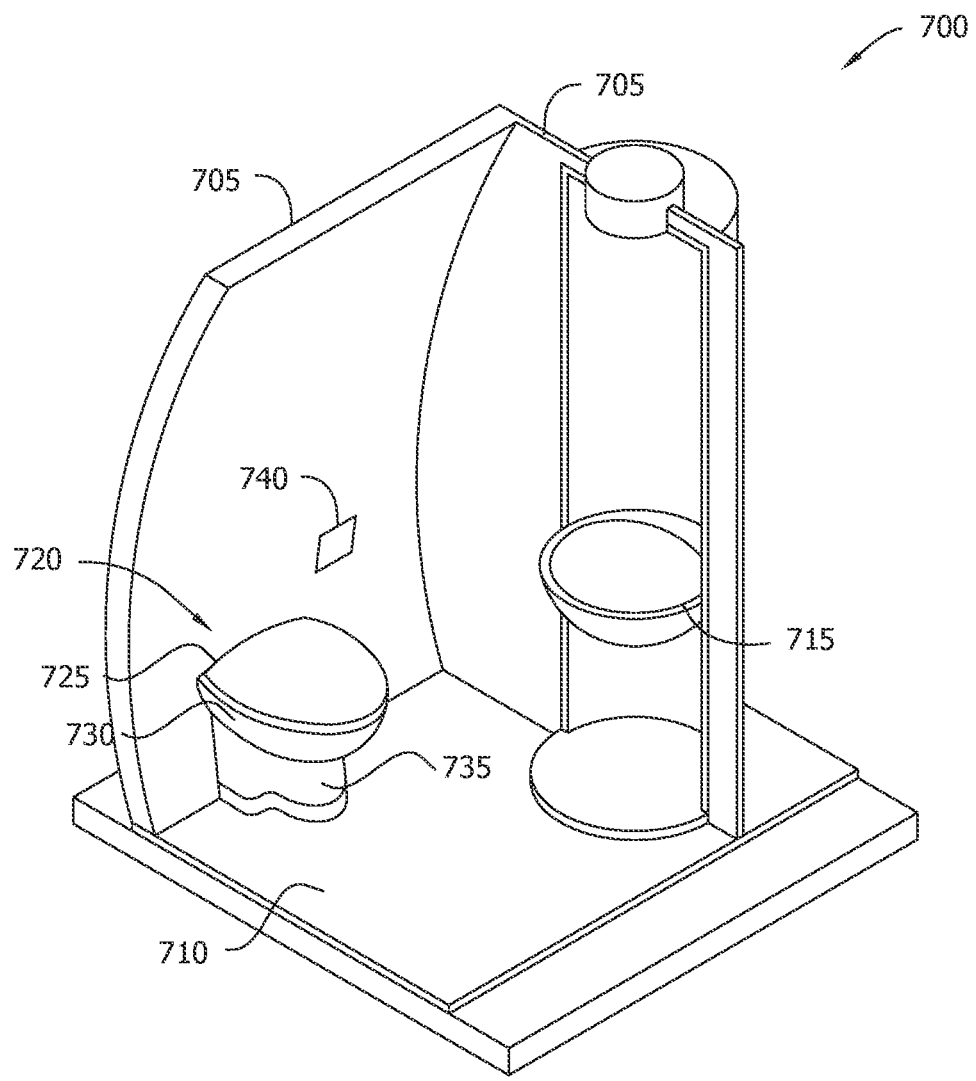
FIG. 7 illustrates a further view of a lavatory using the projector systems shown in FIGS. 1, 2, and 3.

FIG. 7 illustrates a further view of a lavatory 700 using the projector systems 100, 200, and 300 (shown in FIGS. 1, 2, and 3, respectively). Lavatory 700 includes a plurality of walls 705 and a floor 710. Walls 705 and floor 710 can include projector systems 300. Lavatory 700 also includes a sink 715 and a toilet 720. The sink 715 can be similar to sink area 410 (shown in FIG. 4). The toilet 720 includes a toilet lid 725, a toilet seat 730, and a toilet shroud 735. The toilet 720 is associated with a toilet flush button 740.

Figure 8:
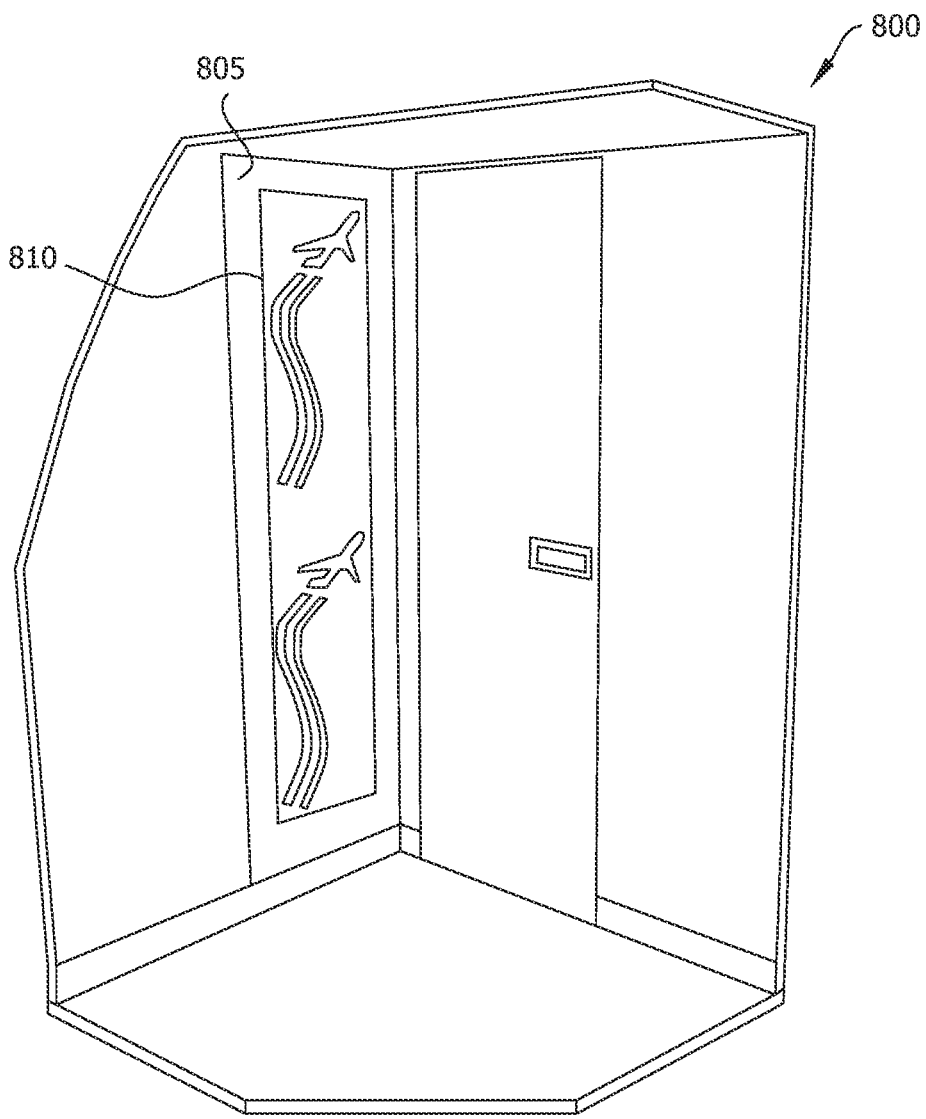
FIG. 8 illustrates a view of use of the projector systems shown in FIGS. 1, 2, and 3.

FIG. 8 illustrates a view 800 of use of the projector systems 100, 200, and 300 (shown in FIGS. 1, 2, and 3). In view 800, an image 810 is being displayed on a feature wall 805. The feature wall 805 can be similar to lavatory wall 705 (shown in FIG. 7). In some examples, the feature wall 805 is in the lavatory 700 (shown in FIG. 7) and is activated when a viewer 120 (shown in FIG. 1) is detected in the lavatory 700, such as when the triggering device 420 (shown in FIG. 4A) associated with the lock transmits a signal to the projector controller 135 (shown in FIG. 1) that the lock is in the locked position.

Figure 9:
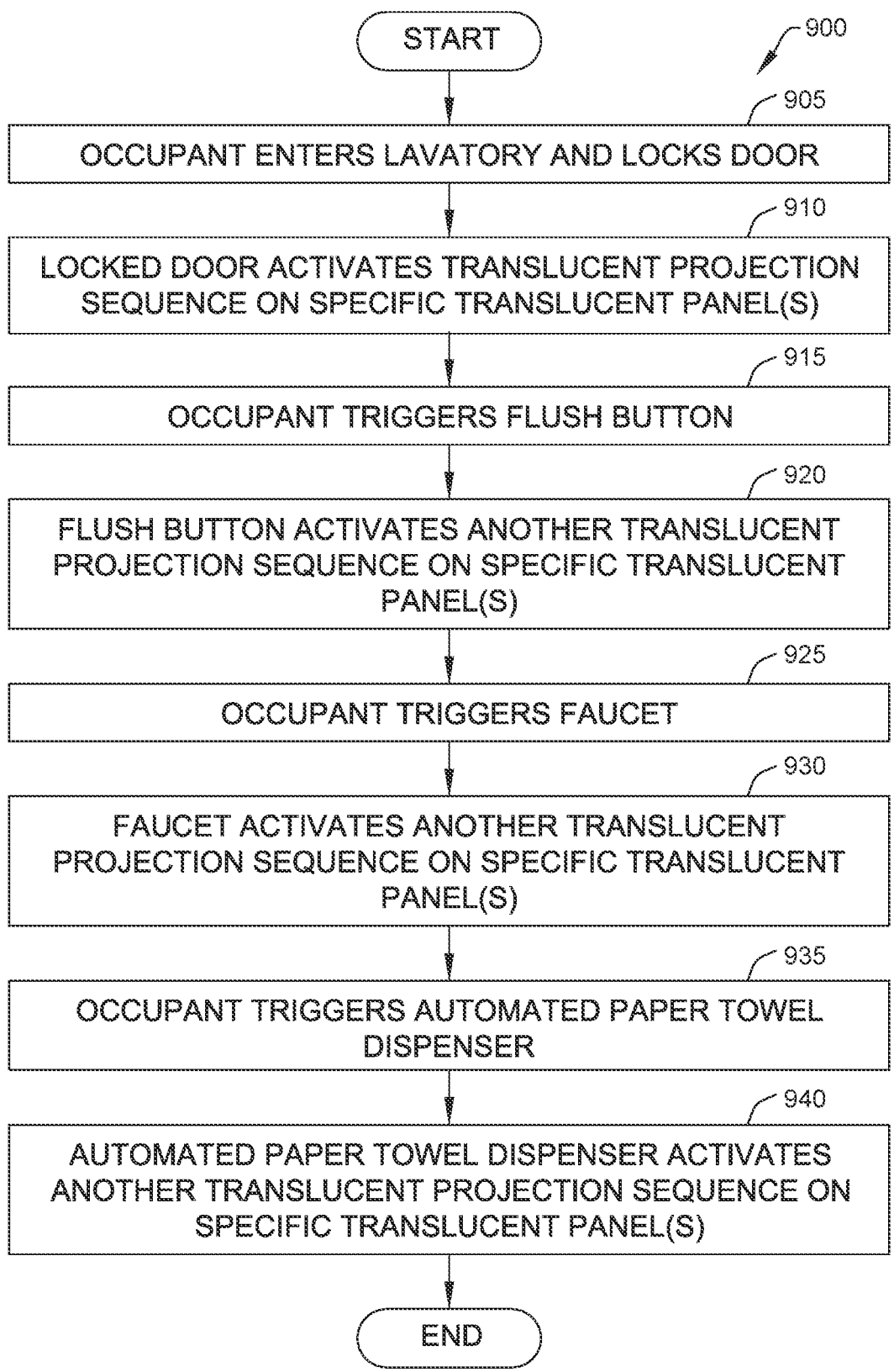
FIG. 9 illustrates a process for using the lavatory-based projector system in accordance with at least one example.

FIG. 9 illustrates a process 900 for using the lavatory-based projector system in accordance with at least one example. In the example, process 900 is implemented by at least one of a projector controller 135 (shown in FIG. 1) and a projector controller computer device 310 (shown in FIG. 3) programmed to control a lavatory 700 (shown in FIG. 7) with a plurality of translucent displays 105 (shown in FIG. 1). In the example, the lavatory 700 can have translucent displays 105 positioned in surfaces, such as, but not limited to, the countertops 405, the sink area 410, the splash back area 415 (all shown in FIG. 4A), the baby changing station 605 (shown in FIG. 6), the feature wall 705 (shown in FIG. 7), or other surface, including but not limited to the toilet 720, the toilet lid 725, the toilet seat 730, the toilet shroud 735, the walls 705, the floor 710 (all shown in FIG. 7), the ceiling, the cabinet faces, and any other visible surface in the lavatory 700. While process 900 describes the use of a projector system 100, 200, and 200 (shown in FIGS. 1, 2, and 3, respectively) in a lavatory setting, the systems and methods described herein may also be used in vehicles, such as, but not limited to aircraft, watercraft, trains, buses, and spacecraft, and on other surfaces in the vehicle, such as, but not limited to, at passenger seats (e.g., tray tables), in galleys (e.g., work decks and sinks), passenger entryways (e.g., ceilings, floors, and walls), bar units (e.g., the countertops and fronts), and any other visible surface of the vehicle. Furthermore, these systems and methods would also be applicable to other environments, such as, but not limited to, bathrooms in homes and businesses (or hotels), kitchens, dining rooms, and other public areas of homes, businesses, or hotels.

In process 900, an occupant enters the lavatory 700 and locks 905 the door. The locking 905 of the door triggers a first triggering device 420 (shown in FIG. 4A) which causes the projector controller 135 to activate 910 a first projection sequence on specific translucent displays 105, such as, but not limited to, the wall 705, ceiling, floor 710, and cabinet faces. A projection sequence is an image, a plurality of images, and/or a video to be displayed on one or more translucent displays 105. As used herein, the first projection sequence, the second projection sequence, and the third projection sequence indicate differing sequences of images or video. Furthermore the different sequences can be projected on the same translucent displays 105 or different translucent displays 105. In some examples, the first projection sequence ends and continues to display an image, such as the last image of the first projection sequence. In other examples, the first projection sequence repeats until interrupted by a specific user action. The projector controller 135 receives a signal from the door lock that the door has been locked 905, from a motion sensor, or any other sensor 305 (shown in FIG. 3) that indicates that projector controller 135 should activate the first display sequence and the projector controller 135 instructs one or more projectors 125 (shown in FIG. 1) to display the first projection sequence.

The user triggering 915 the toilet flush button 740 (shown in FIG. 7) activates 920 the second projection sequence. The second projection sequence can be different from the first projection sequence in content of the projection sequence and/or location of the translucent displays 105 that the second projection sequence is displayed on. In some examples, the second projection sequence is displayed on one or more of the toilet 720, the toilet lid 725, the toilet seat 730, and the toilet shroud 735. In some other examples, the second projection sequence is projected on the same surfaces as the first projection sequence. In some further examples, the second projection sequence is activated 920 after the toilet flush button 740 is triggered 915 and the toilet lid 725 and/or the toilet seat 730 is returned to the down position. In some examples, the projector controller 135 receives a signal that the toilet flush button 740 has been triggered 915 and the projector controller 135 instructs one or more projectors 125 to display the second projection sequence. In some examples, the flush sensor 305 is separate from the toilet flush button 740 and the flush sensor 305 detects when a flush occurs, such as in the case of an automatically flushing toilet.

When the user triggers 925 the faucet, such as by triggering 925 the faucet sensor or triggering device 420 (shown in FIG. 4A), the third projection sequence is activated 930. In some examples, the third projection sequence is displayed on one or more of the countertops 405, the sink area 410, and the splash back area 415. In some other examples, the third projection sequence is projected on the same surfaces as the at least one of the first projection sequence and the second projection sequence. In some examples, the projector controller 135 receives a signal that the faucet sensor or triggering device 420 has been triggered 925 and the projector controller 135 instructs one or more projectors 125 to display the third projection sequence.

When the user triggers 935 an automated paper towel dispenser, the fourth projection sequence is activated 940. In some examples, the fourth projection sequence is displayed on one or more of the countertops 405, the sink area 410, and the splash back area 415. In some other examples, the fourth projection sequence is projected on the same surfaces as the at least one of the first projection sequence, the second projection sequence, and the third projection sequence. In some examples, the projector controller 135 receives a signal that the automated paper towel dispenser has been triggered 935 and the projector controller 135 instructs one or more projectors 125 to display the fourth projection sequence.

In some examples, the different sequences can be triggered in a different order based on the user's actions. Furthermore, one or more of the sequences may not be triggered based on the user's actions. Additional sensors 305 can be present in the lavatory 700 that can trigger other projection sequences.

The projector controller 135 can continue to display one or more sequences until the user disengages the door lock. In other examples, the projector controller 135 continues displaying one or more sequences for a predetermined period of time after the door is unlocked.

The projector controller 135 can also continuously display one or more images or video in a low-powered state, where the images are projected at a lower light level until the door lock is engaged.

Figure 10:
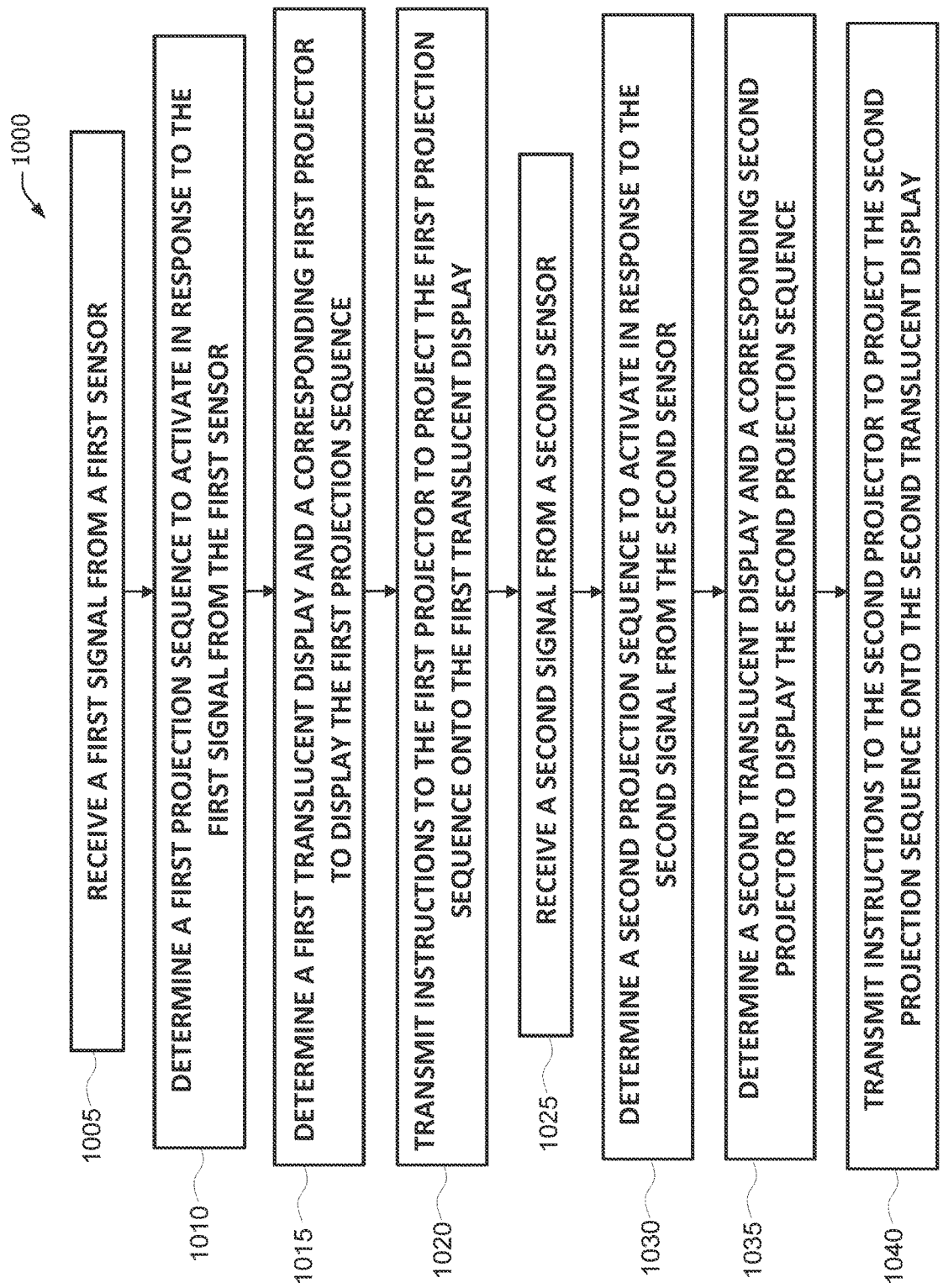
FIG. 10 illustrates another process for using the lavatory-projector system in accordance with at least one example.

FIG. 10 illustrates another process 1000 for using the lavatory-projector system in accordance with at least one example. In the example, process 900 is implemented by at least one of a projector controller 135 (shown in FIG. 1) and a projector controller computer device 310 (shown in FIG. 3) programmed to control a lavatory 700 (shown in FIG. 7) with a plurality of translucent displays 105 (shown in FIG. 1). In the example, the lavatory 700 can have translucent displays 105, such as, but not limited to, the countertops 405, the sink area 410, the splash back area 415 (all shown in FIG. 4A), the baby changing station 605 (shown in FIG. 6), the feature wall 705 (shown in FIG. 7), or other surface, including but not limited to the toilet 720, the toilet lid 725, the toilet seat 730, the toilet shroud 735, the walls 705, the floor 710 (all shown in FIG. 7), the ceiling, the cabinet faces, and any other visible surface in the lavatory 700. While process 1000 describes the use of a projector system 100, 200, and 200 (shown in FIGS. 1, 2, and 3, respectively) in a lavatory setting, the systems and methods described herein may also be used in vehicles, such as, but not limited to aircraft, watercraft, trains, buses, and spacecraft, and on other surfaces in the vehicle, such as, but not limited to, at passenger seats (e.g., tray tables), in galleys (e.g., work decks and sinks), passenger entryways (e.g., ceilings, floors, and walls), bar units (e.g., the countertops and fronts), and any other visible surface of the vehicle. Furthermore, these systems and methods would also be applicable to other environments, such as, but not limited to, bathrooms in homes and businesses (or hotels), kitchens, dining rooms, and other public areas of homes, businesses, or hotels.

In process 1000, the projector controller computer device 310 receives 1005 a first signal from a first sensor 305 (shown in FIG. 3). The first sensor 305 may include any sensor 305, such as, but not limited to, a door lock sensor, a flush sensor, a faucet sensor, a motion sensor, a thermal sensor, and an automatic paper towel dispenser sensor. The projector controller computer device 310 determines 1010 a first projection sequence to display in response to the first signal from the first sensor 305. A projection sequence is an image, a series of images, and/or a video to be displayed on one or more translucent displays 105. The projector controller computer device 310 determines 1015 a first translucent display 105 (shown in FIG. 1) and a corresponding first projector 125 (shown in FIG. 1) to display the first projection sequence. The first translucent display can include a wall 705, a countertop 405, a ceiling, a floor 710, a cabinet face, a splash back area 415, a sink area 410, a toilet 720, a toilet shroud 735, a toilet seat 730, and a toilet lid 725. The projector controller computer device 310 transmits instructions 1020 to the first projector 125 to project the first projection sequence on a projection face 115 (shown in FIG. 1) of the first translucent display 105. Such that the first projection sequence is displayed on a display face 110 (shown in FIG. 1) of the first translucent display 105. The projection face 115 is an opposite side of the first translucent display 105 from the display face 110 of the first translucent display 105. The projector 125 projects the image 130 in reverse onto the projection face 115, so that the image 130 can be displayed in proper orientation on the display face 110 to the viewer 120.

For example, the first sensor 305 may be a faucet sensor, and the projector controller computer device 310 determines that the first translucent display is the sink area face 510 (shown in FIG. 5). The projector controller computer device 310 instructs 1020 the projector 125 associated with the sink area face 510 to display the first projection sequence.

The projector controller computer device 310 receives 1025 a second signal from a second sensor 305. The second sensor 305 may include any sensor 305, such as, but not limited to, a door lock sensor, a flush sensor, a faucet sensor, a motion sensor, a thermal sensor, and an automatic paper towel dispenser sensor. The projector controller computer device 310 determines 1030 a second projection sequence to display in response to the second signal from the second sensor 305. The projector controller computer device 310 determines 1035 a second translucent display 105 and a corresponding second projector 125 to display the second projection sequence. The second translucent display can include a wall 705, a countertop 405, a ceiling, a floor 710, a cabinet face, a splash back area 415, a sink area 410, a toilet 720, a toilet shroud 735, a toilet seat 730, and a toilet lid 725. The projector controller computer device 310 transmits instructions 1040 to the second projector 125 to project the second projection sequence on a projection face 115 of the second translucent display 105. Such that the second projection sequence is displayed on a display face 110 of the second translucent display 105. The projection face 115 is an opposite side of the second translucent display 105 from the display face 110 of the second translucent display 105. The projector 125 projects the image 130 in reverse onto the projection face 115, so that the image 130 can be displayed in proper orientation on the display face 110 to the viewer 120.

For example, the second sensor 305 may be associated with an automatic paper towel dispenser, and the projector controller computer device 310 determines that the second translucent display is the splash back area face 515 (shown in FIG. 5). The projector controller computer device 310 instructs 1020 the projector 125 associated with the splash back area face 515 to display the second projection sequence.

The projector controller computer device 310 receives a third signal from a third sensor 305. The third sensor 305 may include any sensor 305, such as, but not limited to, a door lock sensor, a flush sensor, a faucet sensor, a motion sensor, a thermal sensor, and an automatic paper towel dispenser sensor. The projector controller computer device 310 determines a third projection sequence to display in response to the third signal from the third sensor 305. The projector controller computer device 310 determines a third translucent display 105 and a corresponding third projector 125 to display the third projection sequence. The third translucent display can include a wall 705, a countertop 405, a ceiling, a floor 710, a cabinet face, a splash back area 415, a sink area 410, a toilet 720, a toilet shroud 735, a toilet seat 730, and a toilet lid 725. The projector controller computer device 310 transmits instructions 1040 to the third projector 125 to project the third projection sequence on a projection face 115 of the third translucent display 105. Such that the third projection sequence is displayed on a display face 110 of the third translucent display 105. The projection face 115 is an opposite side of the third translucent display 105 from the display face 110 of the third translucent display 105. The projector 125 projects the image 130 in reverse onto the projection face 115, so that the image 130 can be displayed in proper orientation on the display face 110 to the viewer 120.

The projector controller computer device 310 receives a fourth signal from a fourth sensor 305. The fourth sensor 305 may include any sensor 305, such as, but not limited to, a door lock sensor, a flush sensor, a faucet sensor, a motion sensor, a thermal sensor, and an automatic paper towel dispenser sensor. The projector controller computer device 310 determines a fourth projection sequence to display in response to the fourth signal from the fourth sensor 305. The projector controller computer device 310 transmits instructions 1040 to the third projector 125 to project the fourth projection sequence on a projection face 115 of the third translucent display 105. Such that the fourth projection sequence is displayed on a display face 110 of the third translucent display 105.

The projector controller computer device 310 can also determine a fourth translucent display 105 and corresponding fourth projector 125 to display the fourth projection sequence.

Figure 11:
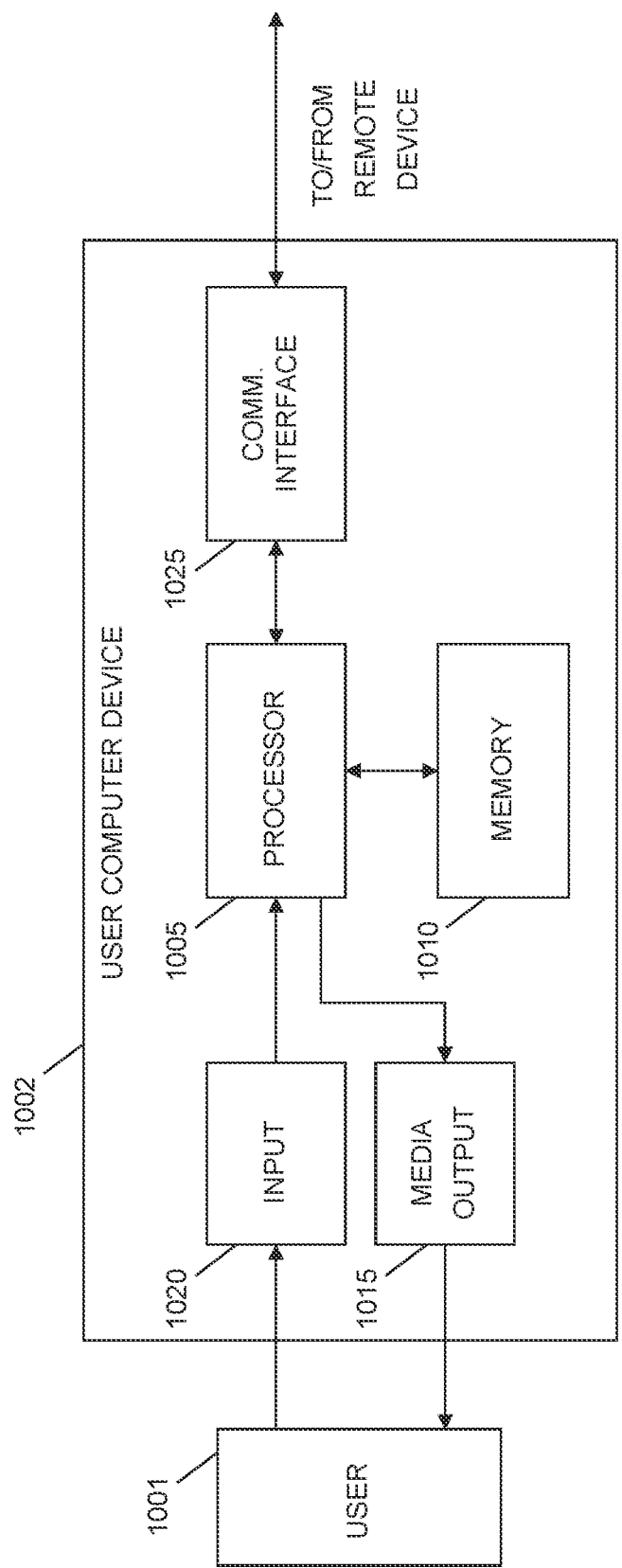
FIG. 11 illustrates an example configuration of a client computer device shown in FIG. 3, in accordance with one example of the present disclosure.

FIG. 11 illustrates an example configuration of a client computer device 325 (shown in FIG. 3), in accordance with the present disclosure. User computer device 1102 is operated by a user 1101. The user computer device 1102 can include, but is not limited to, the projector 125 (shown in FIG. 1), the sensor 305, and the client system 325 (both shown in FIG. 3). The user computer device 1102 includes a processor 1105 for executing instructions. In some examples, executable instructions are stored in a memory area 1110. The processor 1105 can include one or more processing units (e.g., in a multi-core configuration). The memory area 1110 is any device allowing information such as executable instructions and/or transaction data to be stored and retrieved. The memory area 1110 can include one or more computer-readable media.

The user computer device 1102 also includes at least one media output component 1115 for presenting information to the user 1101. The media output component 1115 is any component capable of conveying information to the user 1101. In some examples, the media output component 1115 includes an output adapter (not shown) such as a video adapter and/or an audio adapter. An output adapter is operatively coupled to the processor 905 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some examples, the media output component 1115 is configured to present a graphical user interface (e.g., a web browser and/or a client application) to the user 1101. A graphical user interface may include, for example, an interface for viewing the projection sequences. In some examples, the user computer device 1102 includes an input device 1120 for receiving input from the user 1101. The user 1101 can use the input device 1120 to, without limitation, select a projection sequence. The input device 1120 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen can function as both an output device of the media output component 1115 and the input device 1120.

The user computer device 1102 can also include a communication interface 1125, communicatively coupled to a remote device such as the projector controller computer device 310 (shown in FIG. 3), one or more sensors 305, and one or more projectors 125. The communication interface 1125 can include, for example, a wired or wireless network adapter and/or a wireless data transceiver for use with a mobile telecommunications network.

Stored in the memory area 1110 are, for example, computer-readable instructions for providing a user interface to the user 1101 via the media output component 1115 and, optionally, receiving and processing input from the input device 1120. A user interface can include, among other possibilities, a web browser and/or a client application. Web browsers enable users, such as the user 1101, to display and interact with media and other information typically embedded on a web page or a website from the projector controller computer device 310. A client application allows the user 1101 to interact with, for example, the projector controller computer device 310. For example, instructions can be stored by a cloud service, and the output of the execution of the instructions sent to the media output component 1115.

The processor 1105 executes computer-executable instructions for implementing aspects of the disclosure.

Figure 12:
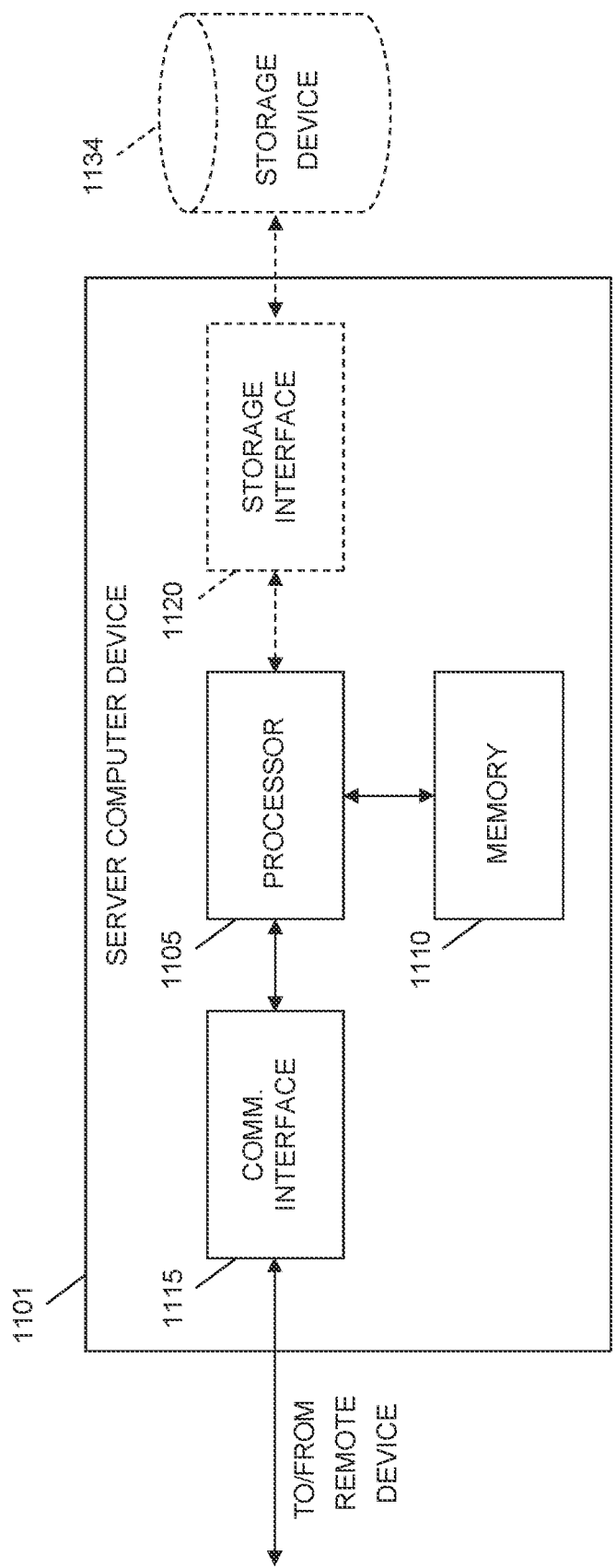
FIG. 12 illustrates an example configuration of the server system shown in FIG. 3, in accordance with one example of the present disclosure.

FIG. 12 illustrates an example configuration of the server system 310 (shown in FIG. 3), in accordance with the present disclosure. Server computer device 1201 can include, but is not limited to, the projector controller 135 (shown in FIG. 1), the projector controller computer device 310, and the database server 315 (both shown in FIG. 3). The server computer device 1201 also includes a processor 1205 for executing instructions. Instructions can be stored in a memory area 1210. The processor 1205 can include one or more processing units (e.g., in a multi-core configuration).

The processor 1205 is operatively coupled to a communication interface 1215 such that the server computer device 1201 is capable of communicating with a remote device such as another server computer device 1201, another projector controller computer device 310, or the client system 325 (shown in FIG. 3). For example, the communication interface 1215 can receive requests from the client system 325 via the Internet, as illustrated in FIG. 3.

The processor 1205 can also be operatively coupled to a storage device 1234. The storage device 1234 is any computer-operated hardware suitable for storing and/or retrieving data, such as, but not limited to, data associated with the database 320 (shown in FIG. 3). In some examples, the storage device 1234 is integrated in the server computer device 1201. For example, the server computer device 1201 may include one or more hard disk drives as the storage device 1234. In other examples, the storage device 1234 is external to the server computer device 1201 and may be accessed by a plurality of server computer devices 1201. For example, the storage device 1234 may include a storage area network (SAN), a network attached storage (NAS) system, and/or multiple storage units such as hard disks and/or solid state disks in a redundant array of inexpensive disks (RAID) configuration.

In some examples, the processor 1205 is operatively coupled to the storage device 1234 via a storage interface 1220. The storage interface 1220 is any component capable of providing the processor 1005 with access to the storage device 1234. The storage interface 1220 can include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1205 with access to the storage device 1234.

The processor 1205 executes computer-executable instructions for implementing aspects of the disclosure. In some examples, the processor 1205 is transformed into a special purpose microprocessor by executing computer-executable instructions or by otherwise being programmed. For example, the processor 1205 is programmed with instructions such as those shown in FIGS. 9 and 10.

The methods and system described herein can be implemented using computer programming or engineering techniques including computer software, firmware, hardware, or any combination or subset. As disclosed above, there is a need for systems providing a cost-effective and reliable manner for customizing surfaces. The system and methods described herein address that need. Additionally, this system: (i) allows customization of surfaces without requiring change of equipment; (ii) allows changing the customization of surfaces without requiring changing of equipment; (iii) provides interaction based on user actions; and (iv) provides unique lavatory experiences.

The methods and systems described herein may be implemented using computer programming or engineering techniques including computer software, firmware, hardware, or any combination or subset thereof, wherein the technical effects may be achieved by performing at least one of the following steps: a) receive a signal from the at least one sensor including a first sensor and a second sensor, including one or more of a door lock sensor, a flush sensor, a faucet sensor, and an automatic paper towel dispenser sensor; b) instruct the at least one projector to project at least one image on the translucent display in response to the signal from the at least one sensor, the translucent display includes one of a wall, a countertop, a ceiling, a floor, a cabinet face, a splash back, a sink, a toilet, a toilet shroud, a toilet seat, and a toilet lid; c) project the image on the second face in reverse such that the image is displayed in proper orientation on the first face; d) project one of a series of images and a video; e) receive a first signal from the first sensor; f) instruct the at least one projector to display at least one of a first image or a first image set; g) receive a second signal from the second sensor; h) instruct the at least one projector to display at least one of a second image or a second image set; i) instruct one or more first projectors associated with the first translucent display to display at least one of the first image or the first image set on the first translucent display; j) instruct one or more second projectors associated with the second translucent display to display at least one of the second image or the second image set on the second translucent display.

The methods and systems may also be achieved by performing at least one of the following steps: a) receiving a first signal from a first sensor; b) determining a first projection sequence to activate in response to the first signal from the first sensor; c) determining a first translucent display and a corresponding first projector to display the first projection sequence in response to the first signal from the first sensor; d) transmitting instructions to the first projector to project the first projection sequence onto a projection face of the first translucent display, such that the first projection sequence is displayed on a display face of the first translucent display, wherein the projection face is an opposite side of the first translucent display from the display face of the first translucent display; e) receiving a second signal from a second sensor, wherein the first sensor is a door lock sensor and wherein the second sensor is a flush sensor; f) determining a second projection sequence to activate in response to the second signal from the second sensor; g) determining a second translucent display and a corresponding second projector to display the second projection sequence in response to the second signal from the second sensor; i) transmitting instructions to the second projector to project the second projection sequence onto a projection face of the second translucent display, such that the second projection sequence is displayed on a display face of the second translucent display, wherein the second translucent display is different from the first translucent display; j) receiving a third signal from a third sensor, wherein the third sensor is a faucet sensor; k) transmitting instructions to a third projector to project a third projection sequence onto a projection face of a third translucent display, such that the third projection sequence is displayed on a display face of the third translucent display, wherein the third translucent display is different from the first translucent display and the second translucent display; l) receiving a fourth signal from a fourth sensor, wherein the fourth sensor is an automatic paper towel dispenser sensor; m) transmitting instructions to the third projector to project a fourth projection sequence onto the projection face of the third translucent display, such that the fourth projection sequence is viewable by the observer on the display face of the third translucent display.

The methods and systems may further be achieved by performing at least one of the following steps: a) receive a first signal from a first sensor of the plurality of sensors, wherein the first sensor comprises one or more of a door lock sensor, a flush sensor, a faucet sensor, and an automatic paper towel dispenser sensor; b) determine a first projection sequence to display based on the first signal, wherein the first projection sequence includes at least one of an image, a series of images, or a video; c) determine one or more translucent displays of the plurality of translucent displays to project the first projection sequence on, wherein the plurality of translucent displays include one or more of a wall, a countertop, a ceiling, a floor, a cabinet face, a splash back, a sink, a toilet, a toilet shroud, a toilet seat, and a toilet lid; d) determine one or more projectors of the plurality of projectors associated with the determined one or more translucent displays; e) transmit instructions to the determined one or more projectors to display the first projection sequence; f) determine a predetermined time period has been exceeded since the first signal; g) transmit instructions to the determined one or more projectors to stop displaying the first projection sequence; h) receive a second signal from a second sensor of the plurality of sensors; i) determine a second projection sequence to display based on the second signal; j) determine a second set of one or more translucent displays of the plurality of translucent displays to project the second projection sequence on; k) determine one or more projectors of the plurality of projectors associated with the determined second set of one or more translucent displays; and l) transmit instructions to the determined one or more projectors to display the second projection sequence.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a translucent display positioned such that a first face is a display face and that a second face is a projection face, wherein the translucent display is a solid, rigid material;
a projector configured to project an image on the second face of the translucent display, wherein the image is displayed on the first face, wherein the projector is positioned at a non-perpendicular angle to the translucent display;
at least one sensor configured to transmit a signal when triggered; and
a projector controller in communication with the projector and the at least one sensor, wherein the projector controller is programmed to:
receive a signal from the at least one sensor; and
instruct the projector to project at least one image on the translucent display in response to the signal from the at least one sensor, wherein the projector is configured to project the at least one image to counter for skew due to the non-perpendicular angle to the translucent display.

2. The system of claim 1, wherein the translucent display is a sink, wherein the at least one image appears in the sink.

3. The system of claim 1, wherein the translucent display is a splash back areas.

4. The system of claim 1, wherein the translucent display is an aircraft wall panel.

5. The system of claim 1, wherein the projector is one of a short throw projector, an ultra-short throw projector, or a goes before objects projector.

6. The system of claim 1, wherein the projector is positioned substantially parallel to the translucent display.

7. The system of claim 1, wherein the projector is configured to project the image on the second face in reverse such that to a viewer of the image on the first face the image is displayed in proper orientation on the first face.

8. The system of claim 1, wherein the projector is configured to project one of a series of images and a video.

9. The system of claim 1, wherein the projector is a first projector, and wherein the system further comprises a second projector, wherein the first projector and the second projector project at least one image on the translucent display.

10. The system of claim 1, wherein the translucent display includes one of a wall, a countertop, a ceiling, a floor, a cabinet face, a toilet, a toilet shroud, a toilet seat, and a toilet lid.

11. The system of claim 1, wherein the sensor comprises one of a door lock sensor, a flush sensor, a faucet sensor, and an automatic paper towel dispenser sensor.

12. A method for operating a projector system, where the method is implemented by a computing device comprising a processor in communication with at least one memory device, the method comprising:
receiving a signal from a sensor;
determining a projection sequence to activate in response to the signal from the sensor;
determining a translucent display and a corresponding projector to display the projection sequence in response to the signal from the sensor, wherein the translucent display is a solid, rigid material, wherein the projector is positioned at a non-perpendicular angle to the translucent display;
transmitting instructions to the projector to project the projection sequence onto a projection face of the translucent display, such that the projection sequence is displayed on a display face of the translucent display, wherein the projection face is an opposite side of the translucent display from the display face of the translucent display; and
projecting the projection sequence to counter for skew due to the non-perpendicular angle to the translucent display.

13. A display apparatus comprising:
a translucent display positioned such that a first face is a display face and that a second face is a projection face, wherein the translucent display is a solid, rigid material;
a projector configured to project an image on the second face of the translucent display, wherein the image is displayed on the first face, wherein the projector is positioned at a non-perpendicular angle to the translucent display; and
a projector controller in communication with the projector, wherein the projector is configured to project the at least one image to counter for skew due to the non-perpendicular angle to the translucent display, wherein the projector controller is programmed to:
receive a signal to display at least one image; and
instruct the projector to project the at least one image on the translucent display in response to the signal.

14. The display apparatus of claim 13, wherein the translucent display is a sink, wherein the at least one image appears in the sink.

15. The display apparatus of claim 13, wherein the translucent display is a splash back areas.

16. The display apparatus of claim 13, wherein the translucent display is an aircraft wall panel.

17. The display apparatus of claim 13, wherein the projector is one of a short throw projector, an ultra-short throw projector, or a goes before objects projector.

18. The display apparatus of claim 13, wherein the projector is positioned parallel to the translucent display.

19. The display apparatus of claim 13, wherein the projector is a first projector, and wherein the display apparatus further comprises a second projector, wherein the first projector and the second projector project at least one image on the translucent display.

20. The display apparatus of claim 13, wherein the translucent display includes one of a wall, a countertop, a ceiling, a floor, a cabinet face, a toilet, a toilet shroud, a toilet seat, and a toilet lid, and wherein the sensor comprises one of a door lock sensor, a flush sensor, a faucet sensor, and an automatic paper towel dispenser sensor.

\* \* \* \* \*